(12) United States Patent
Ogi et al.

(10) Patent No.: US 10,947,363 B2
(45) Date of Patent: Mar. 16, 2021

(54) FILLER FOR TIRES, RUBBER COMPOSITION FOR TIRES, TIRE, METHOD FOR PRODUCING FILLER FOR TIRES, AND AGGREGATION INHIBITOR

(71) Applicant: HARIMA CHEMICALS, INCORPORATED, Kakogawa (JP)

(72) Inventors: Takeshi Ogi, Ibaraki (JP); Tatsuya Tsukamoto, Ibaraki (JP); Aki Nakatsu, Ibaraki (JP)

(73) Assignee: HARIMA CHEMICALS, INCORPORATED, Hyogo (JP)

( * ) Notice: Subject to any disclaimer, the term of this patent is extended or adjusted under 35 U.S.C. 154(b) by 0 days.

(21) Appl. No.: 16/301,628

(22) PCT Filed: May 11, 2017

(86) PCT No.: PCT/JP2017/017904
§ 371 (c)(1),
(2) Date: Nov. 14, 2018

(87) PCT Pub. No.: WO2017/199853
PCT Pub. Date: Nov. 23, 2017

(65) Prior Publication Data
US 2019/0284364 A1 Sep. 19, 2019

(30) Foreign Application Priority Data

| May 16, 2016 | (JP) | JP2016-097771 |
| Nov. 16, 2016 | (JP) | JP2016-223145 |
| Nov. 22, 2016 | (JP) | JP2016-226808 |

(51) Int. Cl.
| C08K 3/36 | (2006.01) |
| C08K 3/013 | (2018.01) |
| B60C 1/00 | (2006.01) |
| C08K 5/17 | (2006.01) |
| C08K 9/04 | (2006.01) |
| C08L 7/00 | (2006.01) |
| C08L 9/06 | (2006.01) |
| C08L 29/04 | (2006.01) |
| C09C 1/30 | (2006.01) |
| C09C 3/08 | (2006.01) |
| C09C 1/28 | (2006.01) |
| C09C 3/10 | (2006.01) |
| C08K 9/08 | (2006.01) |
| C08L 9/00 | (2006.01) |

(52) U.S. Cl.
CPC .................. *C08K 3/36* (2013.01); *B60C 1/00* (2013.01); *B60C 1/0008* (2013.01); *C08K 3/013* (2018.01); *C08K 5/17* (2013.01); *C08K 9/04* (2013.01); *C08K 9/08* (2013.01); *C08L 7/00* (2013.01); *C08L 9/00* (2013.01); *C08L 9/06* (2013.01); *C08L 29/04* (2013.01); *C09C 1/28* (2013.01); *C09C 1/30* (2013.01); *C09C 1/3054* (2013.01); *C09C 1/3063* (2013.01); *C09C 3/08* (2013.01); *C09C 3/10* (2013.01); *B60C 2001/0058* (2013.01); *B60C 2200/02* (2013.01); *B60C 2200/04* (2013.01); *B60C 2200/10* (2013.01); *C01P 2004/64* (2013.01); *C01P 2006/12* (2013.01); *C09C 1/3081* (2013.01)

(58) Field of Classification Search
CPC .... C08L 29/04; C08L 9/06; C08L 7/00; C08L 9/00; C08K 9/04; C08K 5/17; C08K 3/36; C08K 3/013; C08K 9/08; B60C 1/0008; B60C 2200/04; B60C 2200/02; B60C 2200/10; B60C 2001/0058; B60C 1/00; C01P 2004/64; C01P 2006/12; C09C 1/30; C09C 1/3054; C09C 3/08; C09C 1/3063; C09C 1/28; C09C 3/10; C09C 1/3081
USPC ......................................................... 523/156
See application file for complete search history.

(56) References Cited

U.S. PATENT DOCUMENTS

| 3,656,981 A | 4/1972 | Beschke et al. |
| 6,605,304 B1 | 8/2003 | Wellinghoff et al. |
| 2013/0079445 A1 | 3/2013 | Martin et al. |
| 2014/0018479 A1* | 1/2014 | Okada ................... B60C 1/0016 524/232 |
| 2014/0066663 A1 | 3/2014 | Dakka et al. |
| 2014/0323627 A1 | 10/2014 | Yagi et al. |
| 2015/0073067 A1 | 3/2015 | Saitou |

(Continued)

FOREIGN PATENT DOCUMENTS

| CN | 1916059 A | 2/2007 |
| CN | 102198942 | 9/2011 |

(Continued)

OTHER PUBLICATIONS

International Search Report (PCT/ISA/210) dated Jul. 18, 2017, by the Japan Patent Office as the International Searching Authority for International Application No. PCT/JP2017/017904.

(Continued)

*Primary Examiner* — Angela C Scott
(74) *Attorney, Agent, or Firm* — Buchanan, Ingersoll & Rooney PC

(57) ABSTRACT

In a filler for tires containing silica particles and an aggregation inhibitor inhibiting the aggregation of the silica particles, the aggregation inhibitor contains at least one kind selected from the group consisting of phosphate and derivative thereof, amino alcohol, cationic surfactant, water-soluble aminosilane, nitrogen-containing heterocyclic compound, nonionic surfactant, tertiary amine compound, polyvinyl alcohol, non-zinc soap, saturated fatty acid ester, and glycerine fatty acid ester.

11 Claims, No Drawings

(56) References Cited

U.S. PATENT DOCUMENTS

| | | |
|---|---|---|
| 2016/0208074 A1 | 7/2016 | Ogi et al. |
| 2016/0222201 A1 | 8/2016 | Campomizzi et al. |
| 2017/0037265 A1* | 2/2017 | Choi .................. C09D 7/69 |
| 2017/0137600 A1 | 5/2017 | Nishii |
| 2019/0048175 A1 | 2/2019 | Miyazaki |
| 2019/0284364 A1 | 9/2019 | Ogi et al. |

FOREIGN PATENT DOCUMENTS

| | | |
|---|---|---|
| CN | 102775654 | 11/2012 |
| EP | 2 883 901 A1 | 6/2015 |
| EP | 3363856 A1 | 8/2018 |
| JP | 2001-011240 A | 1/2001 |
| JP | 2002-501872 A | 1/2002 |
| JP | 2004-315343 A | 11/2004 |
| JP | 2006-057086 A | 3/2006 |
| JP | 2009-096958 A | 5/2009 |
| JP | 2009-263536 A | 11/2009 |
| JP | 4355482 B2 | 11/2009 |
| JP | 2010-168492 A | 8/2010 |
| JP | 2011-500899 A | 1/2011 |
| JP | 2012-106912 A | 6/2012 |
| JP | 2014-034584 A | 2/2014 |
| JP | 2014-034646 A | 2/2014 |
| JP | 2014-509925 A | 4/2014 |
| JP | 2014-528991 A | 10/2014 |
| JP | 2017206669 A | 11/2017 |
| JP | 2017206670 A | 11/2017 |
| KP | 101409502 B1 | 6/2014 |
| WO | 2013/058320 A1 | 4/2013 |
| WO | 2013/168424 A1 | 11/2013 |
| WO | 2015/030056 A1 | 3/2015 |
| WO | WO-2015152674 A1 * | 10/2015 ............... C08K 9/06 |
| WO | 2015/194086 A1 | 12/2015 |

OTHER PUBLICATIONS

Written Opinion (PCT/ISA/237) dated Jul. 18, 2017, by the Japan Patent Office as the International Searching Authority for International Application No. PCT/JP2017/017904.

PCT International Preliminary Report on Patentability (IPRP) and Written Opinion dated Nov. 29, 2018, in corresponding International Application No. PCT/JP2017/017904 (14 pages).

* cited by examiner

FILLER FOR TIRES, RUBBER COMPOSITION FOR TIRES, TIRE, METHOD FOR PRODUCING FILLER FOR TIRES, AND AGGREGATION INHIBITOR

TECHNICAL FIELD

The present invention relates to a filler for tires, a rubber composition for tires, a tire, a method for producing a filler for tires, and an aggregation inhibitor, to be specific, to a filler for tires, a rubber composition for tires containing the filler for tires, a tire obtained by using the rubber composition for tires, a method for producing a filler for tires, and furthermore, an aggregation inhibitor used in the method for producing a filler for tires.

BACKGROUND ART

It has been known that recently, in view of improvement of various properties such as reduction of rolling resistance, low fuel consumption, and mechanical strength, silica particles as a filler are contained in vehicle tires or the like.

The silica particles are generally blended in a rubber composition that is a material of the vehicle tires or the like. However, there is a disadvantage that the silica particles easily aggregate to easily cause insufficient dispersion in the rubber composition. Thus, as the filler for tires, the silica particles having excellent dispersibility are required.

To be specific, as such a filler for tires, for example, a silica obtained by the following method is proposed: a seed liquid is prepared from a sodium silicate aqueous solution; a feed liquid is prepared from the sodium silicate aqueous solution; and the seed liquid and the feed liquid are mixed with an acid under the presence of a water-soluble molecule (ethylene glycol, polyethylene glycol, or the like) (ref: for example, the following Patent Document 1).

For example, it has been known that a carbon black, a silica, a compound having an oxazoline group, a compound having a carbodiimide group, a compound having an aziridine group, and a polyvinyl alcohol having a hydroxyl group are added to a rubber component such as styrene butadiene rubber (SBR) or the like, to be more specific, it has been known that a carbon black, a silica, and a polyvinyl alcohol are added to a carboxyl group-containing SBR (modified SBR) to be kneaded, so that a rubber composition is obtained. Also, it has been known that a tire having excellent mechanical strength is obtained by the rubber composition (ref: for example, the following Patent Document 2 (Comparative Example 7)).

CITATION LIST

Patent Document

Patent Document 1: Japanese Unexamined Patent Application No. 2012-106912
Patent Document 2: Japanese Unexamined Patent Application No. 2010-168492

SUMMARY OF THE INVENTION

Problem to be Solved by the Invention

Meanwhile, the method described in the above-described Patent Document 1 is complex, and the dispersibility of the silica to be obtained may be not sufficient. Thus, when the obtained silica is used as a filler for tires, the low fuel consumption may not be sufficient.

In the rubber composition and the tire described in the above-described Patent Document 2, there is a disadvantage that the low fuel consumption is insufficient.

An object of the present invention is to provide a filler for tires capable of being easily produced and achieving improvement of low fuel consumption, a rubber composition for tires containing the filler for tires, a tire obtained by using the rubber composition for tires, a method for producing a filler for tires, and furthermore, an aggregation inhibitor used in the method for producing a filler for tires.

Means for Solving the Problem

The first invention [1] includes a filler for tires containing silica particles and an aggregation inhibitor inhibiting the aggregation of the silica particles, wherein the aggregation inhibitor contains at least one kind selected from the group consisting of phosphate and derivative thereof, amino alcohol, cationic surfactant, water-soluble aminosilane, nitrogen-containing heterocyclic compound, nonionic surfactant, tertiary amine compound, polyvinyl alcohol, non-zinc soap, saturated fatty acid ester, and glycerine fatty acid ester.

The first invention [2] includes a rubber composition for tires containing the filler for tires described in the above-described [1] and a rubber component.

The first invention [3] includes a tire made of the rubber composition for tires described in the above-described [2].

The first invention [4] includes a method for producing a filler for tires including an adding step of adding an aggregation inhibitor to a silica slurry obtained from a sodium silicate aqueous solution and containing a never-dried silica and a drying step of drying the silica slurry after the adding step, wherein the aggregation inhibitor contains at least one kind selected from the group consisting of phosphate and derivative thereof, amino alcohol, cationic surfactant, water-soluble aminosilane, nitrogen-containing heterocyclic compound, nonionic surfactant, tertiary amine compound, polyvinyl alcohol, non-zinc soap, saturated fatty acid ester, and glycerine fatty acid ester.

The first invention [5] includes an aggregation inhibitor used in the method for producing a filler for tires described in the above-described [4] containing at least one kind selected from the group consisting of phosphate and derivative thereof, amino alcohol, cationic surfactant, water-soluble aminosilane, nitrogen-containing heterocyclic compound, nonionic surfactant, tertiary amine compound, polyvinyl alcohol, non-zinc soap, saturated fatty acid ester, and glycerine fatty acid ester.

The second invention [6] includes a filler for tires containing silica particles and an aggregation inhibitor inhibiting the aggregation of the silica particles, wherein the aggregation inhibitor contains a polyvinyl alcohol and/or a modified product thereof.

The second invention [7] includes the filler for tires described in the above-described [6], wherein the polyvinyl alcohol has a saponification degree of 80% or more.

The second invention [8] includes the filler for tires described in the above-described [6] or [7], wherein the aggregation inhibitor contains a phosphate ester modified product of a polyvinyl alcohol.

The second invention [9] includes the filler for tires described in any one of the above-described [6] to [8], wherein the aggregation inhibitor contains a salt of a phosphate ester modified product of a polyvinyl alcohol.

The second invention [10] includes a rubber composition for tires containing the filler for tires described in any one of the above-described [6] to [9] and a rubber component.

The second invention [11] includes a tire made of the rubber composition for tires described in the above-described [10].

The second invention [12] includes a method for producing a filler for tires including an adding step of adding an aggregation inhibitor to a silica slurry obtained by a sodium silicate aqueous solution and containing a never-dried silica and a drying step of drying the silica slurry after the adding step, wherein the aggregation inhibitor contains a polyvinyl alcohol and/or a modified product thereof.

The second invention [13] includes an aggregation inhibitor used in the method for producing a filler for tires described in the above-described [12] containing a polyvinyl alcohol and/or a modified product thereof.

Effect of the Invention

In the filler for tires of the present invention (the first invention and the second invention), the silica particles are attached to and/or covered with a specific aggregation inhibitor, so that the aggregation of the silica particles is inhibited. Thus, the filler for tires of the present invention has excellent dispersibility, and a tire having excellent low fuel consumption can be obtained.

The rubber composition for tires and the tire of the present invention contain the filler for tires of the present invention, so that they have excellent low fuel consumption.

According to the method for producing a filler for tires of the present invention and the aggregation inhibitor of the present invention used in the method for producing a filler for tires, the filler for tires of the present invention can be easily produced.

DESCRIPTION OF EMBODIMENTS

<First Invention>

A filler for tires of the present invention contains silica particles and an aggregation inhibitor that inhibits the aggregation of the silica particles.

The silica particles are primary particles made of a silica (silicon dioxide, $SiO_2$).

Although the details are described later, for example, the silica particles can be obtained by neutralizing a sodium silicate aqueous solution with an acid such as sulfuric acid.

The silica particle has a volume average primary particle size (measurement: transmission-type electron microscope) of, for example, 5 nm or more, preferably 20 nm or more, and for example, 100 nm or less, preferably 50 nm or less.

The silica particle has a BET specific surface area (measured in conformity with ISO 5794/1) of, for example, 40 $m^2/g$ or more, preferably 80 $m^2/g$ or more, more preferably 120 $m^2/g$ or more, and for example, 350 $m^2/g$ or less. When the BET specific surface area is within the above-described range, the dispersibility in a rubber composition for tires (described later) can be sufficiently ensured.

These silica particles can be used alone, or the silica particles having a different volume average primary particle size and a different BET specific surface area can be used in combination.

The aggregation inhibitor contains at least one kind selected from the group consisting of phosphate and derivative thereof, amino alcohol, cationic surfactant, water-soluble aminosilane, nitrogen-containing heterocyclic compound, nonionic surfactant, tertiary amine compound, polyvinyl alcohol, non-zinc soap, saturated fatty acid ester, and glycerine fatty acid ester.

Examples of the phosphate and the derivative thereof include condensed phosphates such as sodium hexametaphosphate and sodium pyrophosphate; phosphates such as disodium hydrogenphosphate, sodium dihydrogenphosphate, trisodium phosphate, di sodium hydrogenphosphite, and disodium dihydrogen diphosphate; and phosphate esters such as dibutyl phosphate.

These phosphates and derivatives thereof can be used alone or in combination of two or more.

As the phosphate and derivative thereof, in view of dispersibility, preferably, a condensed phosphate is used, more preferably, a sodium hexametaphosphate and a sodium pyrophosphate are used.

Examples of the amino alcohol include primary amino alcohols such as ethanolamine (monoethanolamine, 2-aminoethanol), propanolamine (monopropanolamine, 3-amino-1-propanol), 1-amino-2-propanol, butanolamine (monobutanolamine, 4-amino-1-butanol), 2-amino-1-butanol, pentanolamine (monopentanolamine, 5-amino-1-pentanol), hexanolamine (monohexanolamine, 6-amino-1-hexanol), 2-(2-aminoethoxy)ethanol, and 2-amino-2-ethyl-1,3-propanediol; secondary amino alcohols such as N-methylethanolamine, N-ethyl ethanolamine, N-n-propyl ethanolamine, N-n-butylethanolamine, N-t-butylethanolamine, N-penthylethanolamine, N-hexylethanolamine, N-heptylethanolamine, N-octylethanolamine, N-(β-aminoethyl)ethanolamine, N-(β-aminoethyl)propanolamine, diethanolamine, 2-(isopropylamino)ethanol, 2-(t-butoxycarbonylamino)-1-ethanol, and 2-(t-butylamino)ethanol; primary and secondary amino alcohols such as N-(β-aminoethyl)isopropanolamine and N-(3-hydroxypropyl)ethylenediamine; and tertiary amino alcohols such as N-methyl-N,N-diethanolamine, N-ethyl-N,N-diethanolamine, N-n-butyl-N,N-diethanolamine, N-t-butyl-N,N-diethanolamine, N,N-dimethylethanolamine, N,N-diethyl ethanolamine, N,N-dibutylethanolamine, N,N-diethylpropanolamine, N,N-diethylisopropanolamine, N,N-dibutylethanolamine (also known as 2-(dibutylamino)ethanol), 2-[[2-(dimethylamino)ethyl]methylamino] ethanol, N-ethyl-N-(2-hydroxyethyl)nitrosamine, N,N,N'-trimethyl-N'-(2-hydroxyethyl)bis(2-aminoethyl)ether, 2-[2-(dimethylamino)ethoxy]ethanol, 2-(diisopropylamino)ethanol, and triethanolamine.

These amino alcohols can be used alone or in combination of two or more.

As the amino alcohol, in view of dispersibility, preferably, a primary amino alcohol and a secondary amino alcohol are used, more preferably, a secondary amino alcohol is used, further more preferably, a N-(β-aminoethyl)ethanolamine and a N-n-butylethanolamine are used, particularly preferably, a N-n-butylethanolamine is used.

Examples of the cationic surfactant include cationic surfactant monomer and cationic surfactant polymer, and in view of dispersibility, preferably, a cationic surfactant monomer is used. To be specific, examples of the cationic surfactant monomer include dimethyldioctadecylammonium chloride, tetramethylammonium chloride, alkylbenzenedimethylammonium chloride, lauryltrimethylammonium chloride, distearyldimethylammonium chloride, and di-long-chain alkyl (alkyl having a carbon number of 4 to 20)-type ammonium chloride.

These cationic surfactants can be used alone or in combination of two or more.

As the cationic surfactant, in view of dispersibility, preferably, a di-long-chain alkyl (alkyl having a carbon number of 4 to 20)-type ammonium chloride is used.

Examples of the water-soluble aminosilane include 3-aminopropyltriethoxysilane, 3-aminopropyltrimethoxysilane, N-(2-aminoethyl)-3-aminopropyltrimethoxysilane, N-(2-aminoethyl)-3-aminopropylmethyldimethoxysilane, and 3-(N-phenyl)aminopropyltrimethoxysilane.

As the water-soluble aminosilane, a commercially available product can be used. Examples of the commercially available product include A-1100 (3-aminopropyltriethoxysilane), A-1110 (3-aminopropyltrimethoxysilane), A-1122 and A-1120 (N-(2-aminoethyl)-3-aminopropyltrimethoxysilane), A-2120 (N-(2-aminoethyl)-3-aminopropylmethyldimethoxysilane), and Y-9669 (3-(N-phenyl)aminopropyltrimethoxysilane) (all of those are manufactured by Momentive Performance Materials).

These water-soluble aminosilanes can be used alone or in combination of two or more.

As the water-soluble aminosilane, in view of dispersibility, preferably, a N-(2-aminoethyl)-3-aminopropyltrimethoxysilane is used.

Examples of the nitrogen-containing heterocyclic compound include imidazolines and derivatives thereof such as 1-hydroxyethyl-2-methyl imidazoline, 1-hydroxyethyl-2-propyl imidazoline, 1-hydroxyethyl-2-heptyl imidazoline, 1-hydroxyethyl-2-nonyl imidazoline, 1-hydroxyethyl-2-undecyl imidazoline, 1-hydroxypropyl-2-methyl imidazoline, 1-hydroxypropyl-2-propyl imidazoline, 1-hydroxypropyl-2-heptyl imidazoline, 1-hydroxypropyl-2-nonyl imidazoline, 1-hydroxypropyl-2-undecyl imidazoline, 1-hydroxybutyl-2-undecyl imidazoline, and tall oil fatty acid imidazoline; imidazoles and derivatives thereof such as imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, 2-heptadecyl imidazole, 1,2-dimethyl imidazole, and 2-phenyl imidazole; and imidazolinium betaine compounds such as 2-alkyl-N-carboxymethyl-N-hydroxyethyl imidazolinium betaine.

These nitrogen-containing heterocyclic compounds can be used alone or in combination of two or more.

As the nitrogen-containing heterocyclic compound, in view of dispersibility, preferably, an imidazoline derivative, an imidazole derivative, and an imidazolinium betaine compound are used, more preferably, a tall oil fatty acid imidazoline, a 2-ethyl-4-methyl imidazole, and a 2-alkyl-N-carboxymethyl-N-hydroxyethyl imidazolinium betaine are used.

Examples of the nonionic surfactant (nonionic surfactant) include alkyl alkanolamine and alkyl alkanolamide.

An example of the alkyl alkanolamine includes an alkyl alkanolamine having a polyoxyethylene group, and to be specific, examples thereof include polyoxyethylene octyl amine, polyoxyethylene decylamine, polyoxyethylene dodecylamine, polyoxyethylene tetradecylamine, polyoxyethylene hexadecylamine, polyoxyethylene octadecylamine (polyoxyethylene stearylamine), and polyoxyethylene octadecenylamine.

These alkyl alkanolamines can be used alone or in combination of two or more.

As the alkyl alkanolamine, in view of dispersibility, preferably, an alkyl alkanolamine is used, more preferably, polyoxyethylene octadecylamine (polyoxyethylene stearylamine) is used.

Examples of the alkyl alkanolamide include monoalkanolamides such as monoethanolamide octanoate, monoisopropanepropanolamide octanoate, monoethanolamide polyoxyethylene octanoate, monoethanolamide laurate, monoisopropanolamide laurate, monoethanolamide stearate, monoethanolamide oleate, monoethanolamide polyoxyethylene laurate, and coconut oil fatty acid N-methylethanolamide and dialkanolamides such as diethanolamide octanoate, diisopropanolamide octanoate, diethanolamide laurate, diethanolamide polyoxyethylene laurate, diethanolamide stearate, diethanolamide oleate, and diethanolamide polyoxyethylene oleate.

These alkyl alkanolamides can be used alone or in combination of two or more.

As the alkyl alkanolamide, preferably, a monoalkanolamide and a dialkanolamide are used, more preferably, a coconut oil fatty acid N-methylethanolamide and a diethanolamide laurate are used.

In the nonionic surfactant, the polyoxyethylene has an average addition mole number of, for example, 1 or more, preferably 2 or more, and for example, 40 or less, preferably 30 or less.

These nonionic surfactants can be used alone or in combination of two or more.

As the nonionic surfactant, in view of dispersibility, preferably, an alkyl alkanolamine is used.

Examples of the tertiary amine compound include trioctylamine, trilaurylamine, dimethylstearylamine, dimethyldecylamine, dimethylmyristylamine, dilaurylmonomethylamine, dimethyloctadecylamine (dimethyl stearylamine), dimethyloctadecenylamine, and dimethylhexadecenylamine.

These tertiary amine compounds can be used alone or in combination of two or more.

As the tertiary amine compound, preferably, a dimethyloctadecylamine (dimethylstearylamine) is used.

The polyvinyl alcohol is not particularly limited, and for example, a polyvinyl alcohol having a saponification degree of 30 to 99 is used, preferably, a polyvinyl alcohol having a saponification degree of 80 to 95 is used.

Examples of the non-zinc soap include lithium stearate, magnesium stearate, calcium stearate, barium stearate, calcium laurate, barium laurate, calcium ricinoleate, barium ricinoleate, and calcium octylate.

These non-zinc soaps can be used alone or in combination of two or more.

As the saturated fatty acid ester, a known saturated fatty acid ester is used.

These saturated fatty acid esters can be used alone or in combination of two or more.

The saturated fatty acid ester is preferably used by being mixed with the above-described non-zinc soap.

In this case, the mixing ratio of the saturated fatty acid ester to the non-zinc soap is not particularly limited, and is appropriately set in accordance with its purpose and use.

Examples of the glycerine fatty acid ester include monoglyceride oleate and monoglyceride stearate.

These glycerine fatty acid esters can be used alone or in combination of two or more.

Preferably, the aggregation inhibitor consists of any one kind of the phosphate and the derivative thereof, the amino alcohol, the cationic surfactant, the water-soluble aminosilane, the nitrogen-containing heterocyclic compound, the nonionic surfactant, the tertiary amine compound, the polyvinyl alcohol, a mixture of the non-zinc soap and the saturated fatty acid ester, and the glycerine fatty acid ester.

In view of dispersibility, more preferably, the aggregation inhibitor consists of any one kind of the phosphate and the derivative thereof, the amino alcohol, the cationic surfactant, the water-soluble aminosilane, the nitrogen-containing heterocyclic compound, the nonionic surfactant, and the tertiary amine compound.

Further more preferably, the aggregation inhibitor consists of any one kind of the phosphate and the derivative thereof, the amino alcohol, the cationic surfactant, the water-soluble aminosilane, the nitrogen-containing heterocyclic compound, and the nonionic surfactant. Further more preferably, the aggregation inhibitor consists of any one kind of the phosphate and the derivative thereof, the amino alcohol, the cationic surfactant, the water-soluble aminosilane, and the nitrogen-containing heterocyclic compound. Further more preferably, the aggregation inhibitor consists of any one kind of the phosphate and the derivative thereof, the amino alcohol, the cationic surfactant, and the water-soluble aminosilane. Further more preferably, the aggregation inhibitor consists of any one kind of the phosphate and the derivative thereof, the amino alcohol, and the cationic surfactant. Further more preferably, the aggregation inhibitor consists of the phosphate and the derivative thereof, and the amino alcohol. Particularly preferably, the aggregation inhibitor consists of the phosphate and the derivative thereof.

As the aggregation inhibitor, in view of dispersibility, preferably, a compound having suspension stability (that is, suspension stabilizer) is used, and examples of the compound include the phosphate and the derivative thereof, and the polyvinyl alcohol.

The filler for tires can be, for example, obtained by the following method.

That is, in this method, first, the above-described aggregation inhibitor is added to a silica slurry (adding step).

As the silica slurry, a silica slurry obtained from a sodium silicate aqueous solution and containing never-dried silica particles (primary particles of the silica) is used. The silica slurry can be, for example, obtained by adding an acid to the sodium silicate aqueous solution to be neutralized.

The sodium silicate aqueous solution is not particularly limited, and can be obtained by a known method.

The concentration of the sodium silicate aqueous solution in terms of $SiO_2$ is, for example, 1 g/L or more, preferably 5 g/L or more, and for example, 250 g/L or less, preferably 100 g/L or less.

Examples of the acid include inorganic acids such as hydrochloric acid, phosphoric acid, and sulfuric acid and organic acids such as acetic acid, propionic acid, and benzoic acid. These can be used alone or in combination of two or more. As the acid, preferably, an inorganic acid is used, more preferably, a sulfuric acid is used.

The addition ratio of the acid is not particularly limited, and is, for example, adjusted so that a pH after the addition of the acid is within a predetermined range. To be specific, the pH after the addition of the acid is, for example, 2 or more, preferably 3 or more, and for example, 7 or less, preferably 6.5 or less.

The addition method is not particularly limited, and may be collective addition or separate addition.

In this manner, the silica slurry containing the silica particles can be obtained. The silica slurry is a slurry obtained by neutralizing the sodium silicate aqueous solution and before the following drying step.

Also, water is added to the silica slurry as needed, and the concentration thereof can be adjusted.

The silica concentration (solid content concentration) of the silica slurry is, for example, 1 mass % or more, preferably 5 mass % or more, and for example, 30 mass % or less, preferably 25 mass % or less.

The addition ratio of the aggregation inhibitor with respect to 100 parts by mass of the silica particles in the silica slurry in terms of the solid content is, for example, 0.1 parts by mass or more, preferably 0.2 parts by mass or more, and for example, 50 parts by mass or less, preferably 10 parts by mass or less.

The addition method of the aggregation inhibitor is not particularly limited, and may be collective addition or separate addition.

When the aggregation inhibitor is added to the silica slurry, the aggregation inhibitor is absorbed to the surfaces of the silica particles in the silica slurry, and as a result, the silica particles (primary particles) are attached to and/or covered with the aggregation inhibitor. In this manner, the aggregation of the silica particles is inhibited. That is, the aggregation inhibitor functions as a dispersant. The aggregation inhibitor is included in the present invention.

Next, in this method, after the above-described adding step, the silica slurry is dried (drying step).

The drying step is not particularly limited, and examples thereof include vacuum drying method, vacuum stirring and drying method, and spray drying method. Preferably, a spray drying method is used.

As the drying conditions in the spray drying method, for example, an entry temperature of a spray dryer is, for example, 100° C. or more, preferably 200° C. or more, and for example, 1000° C. or less, preferably 720° C. or less. An exit temperature thereof is, for example, 50° C. or more, preferably 90° C. or more, and for example, 700° C. or less, preferably 250° C. or less.

In this manner, the filler for tires containing the silica particles and the aggregation inhibitor can be obtained.

According to the above-described method for producing a filler for tires and the above-described aggregation inhibitor used in the method for producing a filler for tires, the filler for tires can be easily produced.

To be more specific, for example, when the silica particles are dried before the addition of the aggregation inhibitor, there may be a case where the silica particles are aggregated, and secondary particles are formed. In this case, when the obtained secondary particles of the silica are again water-dispersed, and the above-described aggregation inhibitor is added to the obtained silica slurry, the aggregation inhibitor is not absorbed to the surfaces of the primary particles of the silica, and the aggregation inhibitor is absorbed to the surfaces of the secondary particles of the silica. As a result, the silica particles (secondary particles) to be obtained have poor dispersibility compared to a case where the aggregation inhibitor is absorbed to the surfaces of the primary particles of the silica.

Meanwhile, in the above-described method, the aggregation inhibitor is added to the silica slurry containing never-dried silica particles. Thus, the aggregation inhibitor is absorbed to the surfaces of the primary particles of the silica, and the primary particles of the silica are attached to and/or covered with the aggregation inhibitor. That is, the aggregation inhibitor is filled with and disposed between the plurality of silica particles so as to be attached to the entire surfaces of the silica particles or a part of the surfaces of the silica particles. As a result, in the above-described method, the above-described filler for tires having excellent dispersibility can be easily produced.

In the filler for tires, as described above, the silica particles are attached to and/or covered with the specific aggregation inhibitor, so that the aggregation of the silica particles is inhibited. Thus, the filler for tires has excellent dispersibility, and a tire (described later) having excellent low fuel consumption can be obtained.

That is, the filler for tires is used in the production of a rubber composition for tires and a tire.

To be more specific, the rubber composition for tires of the present invention contains the above-described filler for tires and a rubber component.

The rubber component is not particularly limited, and an example thereof includes a diene rubber.

The diene rubber is not particularly limited, and examples thereof include natural rubber (NR), styrene butadiene rubber (SBR), butadiene rubber (BR), isoprene rubber (IR), butyl rubber (IIR), acrylonitrile butadiene rubber (NBR), ethylene propylene diene rubber (EPDM), and chloroprene rubber (CR).

These rubber components can be used alone or in combination of two or more.

In view of improvement of the strength and the abrasion resistance of a molded article to be obtained, as the rubber component, preferably, a natural rubber (NR), a styrene butadiene rubber (SBR), and a butadiene rubber (BR) are used, more preferably, a styrene butadiene rubber (SBR) and a butadiene rubber (BR) are used in combination.

When the styrene butadiene rubber (SBR) and the butadiene rubber (BR) are used in combination, as the combination ratio thereof, the ratio of the styrene butadiene rubber (SBR) with respect to 100 parts by mass of the total amount of the styrene butadiene rubber (SBR) and the butadiene rubber (BR) is, for example, 40 parts by mass or more, preferably 60 parts by mass or more, and for example, 95 parts by mass or less, preferably 85 parts by mass or less. The ratio of the butadiene rubber (BR) with respect to 100 parts by mass of the total amount of the styrene butadiene rubber (SBR) and the butadiene rubber (BR) is, for example, 5 parts by mass or more, preferably 15 parts by mass or more, and for example, 60 parts by mass or less, preferably 40 parts by mass or less.

When the combination ratio of the styrene butadiene rubber (SBR) and the butadiene rubber (BR) is within the above-described range, the improvement of the strength and the abrasion resistance of the molded article to be obtained can be achieved.

In the rubber composition for tires, the mixing ratio of the filler for tires to the rubber component is appropriately set in accordance with its purpose and use, and for example, the mixing ratio of the filler for tires with respect to 100 parts by mass of the rubber component is, for example, 1 part by mass or more, preferably 10 parts by mass or more, and for example, 140 parts by mass or less, preferably 120 parts by mass or less.

Also, the rubber composition for tires can contain another filler (filler excluding the above-described filler for tires).

Examples of the other filler include inorganic fillers such as calcium carbonate, magnesium carbonate, silicate and salts thereof, clay, talc, mica powder, bentonite, alumina, aluminum silicate, acetylene black, and aluminum powder and organic fillers such as cork. These can be used alone or in combination of two or more.

When the other filler is mixed, the mixing ratio thereof is appropriately set in accordance with its purpose and use, and the mixing ratio thereof with respect to 100 parts by mass of the rubber component is, for example, 1 part by mass or more, preferably 10 parts by mass or more, and for example, 140 parts by mass or less, preferably 120 parts by mass or less.

The rubber composition for tires preferably contains a vulcanizing agent.

An example of the vulcanizing agent includes sulfur.

The sulfur is not particularly limited, and examples thereof include powdered sulfur, precipitated sulfur, colloidal sulfur, insoluble sulfur, and highly dispersible sulfur.

These vulcanizing agents can be used alone or in combination of two or more.

The mixing ratio of the vulcanizing agent with respect to 100 parts by mass of the rubber component is, for example, 0.5 parts by mass or more, preferably 1 part by mass or more, and for example, 5 parts by mass or less, preferably 3 parts by mass or less.

The rubber composition for tires preferably contains a vulcanizing accelerator.

Examples of the vulcanizing accelerator include zinc oxide, stearic acid, furthermore, sulfenamide-based vulcanizing accelerator [N-tert-butyl-2-benzothiazolyl sulfenamide (TBBS), N-cyclohexyl-2-benzothiazolyl sulfenamide (CBS), N,N-dicyclohexyl-2-benzothiazolyl sulfenamide (DCBS), N,N-diisopropyl-2-benzothiazole sulfenamide, or the like], and guanidine-based vulcanizing accelerator (diphenylguanidine (DBG), diorthotriguanidine, triphenylguanidine, orthotolylbiguanide, and diphenylguanidinephthalate).

These vulcanizing accelerators can be used alone or in combination of two or more.

The mixing ratio of the vulcanizing accelerator is appropriately set in accordance with its purpose and use.

Furthermore, various known additives can be blended in the rubber composition for tires at an appropriate ratio as needed. Examples thereof include deterioration inhibitor (for example, antiozonant, thermal deterioration inhibitor, oxidation deterioration inhibitor), crack inhibitor, silane coupling agent, vulcanizing accelerator, furthermore, vulcanizing auxiliary, vulcanizing retardant, vulcanizing activator, plasticizer, softener (treated distilled aromatic extracts (TDAE) or the like), and antioxidant.

These additives may be, for example, blended into at least any one of the above-described components in advance, or may be simultaneously blended at the mixing thereof.

The rubber composition for tires can be obtained by mixing the above-described each of the components.

The mixing method is not particularly limited, and for example, a known rubber kneading machine such as roller, Banbury mixer, and kneader can be used. The mixing conditions are not particularly limited, and are appropriately set in accordance with a device to be used or the like.

The rubber composition for tires contains the above-described filler for tires, so that a tire having excellent low fuel consumption can be obtained.

The above-described rubber composition for tires is preferably used in the production of a tire of vehicles with low fuel consumption.

The method for producing a tire by using the above-described rubber composition for tires is not particularly limited, and a known vulcanizing molding method can be used.

That is, for example, the rubber composition for tires in an unvulcanized state is extruded and processed in accordance with the shape of the tire to be attached to a member of another tire member (for example, side wall portion, shoulder portion, bead portion, inner liner, or the like) on a tire molding machine, so that an unvulcanized tire is formed. Next, the unvulcanized tire is heated and pressed in a vulcanizer to be vulcanized.

The tire thus obtained contains the above-described filler for tires, so that it has excellent low fuel consumption.

Thus, the tire thus obtained can be preferably used as, for example, a tire for various vehicles such as automobiles, two-wheeled vehicles, and railway vehicles (for example, monorails or the like) and for example, a tire for aircrafts.

<Second Invention>

A filler for tires of the present invention contains silica particles and an aggregation inhibitor that inhibits the aggregation of the silica particles.

As the silica particles, the same silica particles as those in the above-described first invention are used.

These silica particles can be used alone, or the silica particles having a different volume average primary particle size and a different BET specific surface area can be used in combination.

The aggregation inhibitor contains a polyvinyl alcohol and/or a modified product thereof.

The polyvinyl alcohol can be obtained by a known method. To be specific, first, a vinyl acetate monomer is polymerized to produce a polyvinyl acetate and next, the polyvinyl acetate is partially saponified or completely saponified, so that a polyvinyl alcohol can be obtained.

The polyvinyl alcohol has a saponification degree of, for example, 50% or more, preferably 70% or more, more preferably 75% or more, further more preferably 80% or more, particularly preferably 85% or more, and usually 100% or less, in view of production efficiency, preferably 99.9% or less.

When the saponification degree of the polyvinyl alcohol is within the above-described range, the improvement of the dispersibility and the low fuel consumption can be more excellently achieved.

An example of a modified product of the polyvinyl alcohol includes a phosphate ester modified product of the polyvinyl alcohol.

The phosphate ester modified product of the polyvinyl alcohol can be, for example, obtained by allowing the polyvinyl alcohol to react with a phosphoric acid source compound.

The phosphoric acid source compound is a compound that forms a phosphate ester group by reacting with a hydroxyl group, and examples thereof include phosphoric acid ($H_3PO_4$) and phosphoric anhydride ($P_2O_5$). These can be used alone or in combination of two or more. When the phosphoric anhydride ($P_2O_5$) is used, the phosphoric anhydride ($P_2O_5$) and water ($H_2O$) are used in combination.

As the phosphoric acid source compound, in view of production efficiency of the phosphate ester modified product of the polyvinyl alcohol, preferably, a phosphoric acid ($H_3PO_4$) is used.

The polyvinyl alcohol and the phosphoric acid source compound react, for example, under the presence of an organic solvent.

The organic solvent is not particularly limited as long as it is inert with respect to the polyvinyl alcohol and the phosphoric acid source compound, and examples thereof include aprotic polar solvents such as N,N-dialkyl(meth) acrylamide, dimethylformamide (DMF), N,N-dimethylacetoamide (DMAc), tetrahydrofuran (THF), and dimethylsulfoxide (DMSO). These can be used alone or in combination of two or more. As the organic solvent, preferably, a dimethylsulfoxide is used.

To react the polyvinyl alcohol with the phosphoric acid source compound, first, the polyvinyl alcohol is mixed with the organic solvent to be heated as needed. In this manner, a solution of the polyvinyl alcohol is obtained.

The heating temperature differs in accordance with the melting point and the boiling point of the organic solvent, and is, for example, 50° C. or more, preferably 60° C. or more, more preferably 80° C. or more, and for example, 160° C. or less, preferably 140° C. or less, more preferably 120° C. or less. The heating time is until the polyvinyl alcohol is completely dissolved in the organic solvent, and is appropriately set.

In the solution of the polyvinyl alcohol, the concentration of the polyvinyl alcohol is, for example, 3 mass % or more, preferably 5 mass % or more, and for example, 30 mass % or less, preferably 15 mass % or less.

Next, in this method, the phosphoric acid source compound is added to the obtained solution of the polyvinyl alcohol.

The addition amount of the phosphoric acid source compound is the ratio where the hydroxyl group in the polyvinyl alcohol and the phosphoric acid source compound are equal moles or more, and the ratio of the phosphoric acid source compound with respect to 100 parts by mass of the polyvinyl alcohol is, for example, 100 parts by mass or more, preferably 150 parts by mass or more, and for example, 300 parts by mass or less, preferably 200 parts by mass or less.

The addition method of the phosphoric acid source compound is not particularly limited, and may be, for example, collective addition or separate addition.

Thereafter, in this method, heating is carried out as needed, and the polyvinyl alcohol reacts with the phosphoric acid source compound.

The reaction temperature is, for example, 50° C. or more, preferably 60° C. or more, more preferably 80° C. or more, and for example, 160° C. or less, preferably 140° C. or less, more preferably 120° C. or less.

The reaction time is, for example, 0.5 hours or more, preferably 1 hour or more, and for example, 10 hours or less, preferably 5 hours or less.

In this manner, the hydroxyl group of the polyvinyl alcohol is modified into a phosphate ester group, and a phosphate ester modified product of the polyvinyl alcohol can be obtained.

By using the phosphate ester modified product of the polyvinyl alcohol as the aggregation inhibitor, the improvement of the dispersibility and the low fuel consumption can be more excellently achieved.

The phosphate ester modified product of the polyvinyl alcohol preferably forms a salt (phosphate ester salt). In other words, as the aggregation inhibitor, preferably, the phosphate ester salt of the polyvinyl alcohol is used.

The phosphate ester salt of the polyvinyl alcohol can be obtained by mixing the phosphate ester modified product of the polyvinyl alcohol with a basic compound.

Examples of the basic compound include alkali metal compounds such as sodium hydroxide and potassium hydroxide; amine compounds such as alkanolamine including N-ethanolamine, N,N-diethanolamine, N,N,N-triethanolamine, N-n-propanolamine, N-isopropanolamine, N,N-diisopropanolamine, N,N,N-triisopropanolamine, N-n-butanolamine, N-t-butanolamine, N,N-dibutanolamine, and N,N,N-tributanolamine; and ammonia.

As the basic compound, preferably, an alkali metal compound and an amine compound (more preferably, alkanolamine) are used, further more preferably, a sodium hydroxide and a N-n-butylethanolamine are used.

When the alkali metal is used as the basic compound, a metal salt of the phosphate ester of the polyvinyl alcohol is obtained. When the amine compound is used as the basic compound, an amine salt of the phosphate ester of the polyvinyl alcohol is obtained.

The addition amount of the basic compound with respect to 1 equivalent of the phosphate ester group in the phosphate ester modified product of the polyvinyl alcohol is, for example, 0.4 equivalent or more, preferably 0.6 equivalent or more, and for example, 1.2 equivalent or less, preferably 1.1 equivalent or less.

By using the salt of the phosphate ester modified product of the polyvinyl alcohol as the aggregation inhibitor, the improvement of the dispersibility and the low fuel consumption can be more excellently achieved.

Also, the aggregation inhibitor can contain, in addition to the polyvinyl alcohol and/or the modified product thereof, for example, the phosphate and the derivative thereof, the amino alcohol, the cationic surfactant, the water-soluble aminosilane, the nitrogen-containing heterocyclic compound, the nonionic surfactant, the tertiary amine compound, the non-zinc soap, the saturated fatty acid ester, the glycerine fatty acid ester, or the like at an appropriate ratio.

The aggregation inhibitor preferably contains only the polyvinyl alcohol and/or the modified product thereof. In other words, the aggregation inhibitor consists of the polyvinyl alcohol and/or the modified product thereof.

The filler for tires is obtained by the same method as that of the above-described first invention.

That is, in this method, first, the above-described aggregation inhibitor is added to the silica slurry in the same manner as that of the above-described first invention (adding step).

When the aggregation inhibitor is added to the silica slurry, the aggregation inhibitor is absorbed to the surfaces of the silica particles in the silica slurry, and as a result, the silica particles (primary particles) are attached to and/or covered with the aggregation inhibitor. In this manner, the aggregation of the silica particles is inhibited. That is, the aggregation inhibitor functions as a dispersant. The aggregation inhibitor is included in the present invention.

Next, in this method, after the above-described adding step, the silica slurry is dried (drying step).

In this manner, the filler for tires containing the silica particles and the aggregation inhibitor can be obtained.

According to the above-described method for producing a filler for tires and the above-described aggregation inhibitor used in the method for producing a filler for tires, the filler for tires can be easily produced.

To be more specific, for example, when the silica particles are dried before the addition of the aggregation inhibitor, there may be a case where the silica particles are aggregated, and secondary particles are formed. In this case, when the obtained secondary particles of the silica are again water-dispersed, and the above-described aggregation inhibitor is added to the obtained silica slurry, the aggregation inhibitor is not absorbed to the surfaces of the primary particles of the silica, and the aggregation inhibitor is absorbed to the surfaces of the secondary particles of the silica. As a result, the silica particles (secondary particles) to be obtained have poor dispersibility compared to a case where the aggregation inhibitor is absorbed to the surfaces of the primary particles of the silica.

Meanwhile, in the above-described method, the aggregation inhibitor is added to the silica slurry containing never-dried silica particles. Thus, the aggregation inhibitor is absorbed to the surfaces of the primary particles of the silica, and the primary particles of the silica are attached to and/or covered with the aggregation inhibitor. That is, the aggregation inhibitor is filled with and disposed between the plurality of silica particles so as to be attached to the entire surfaces of the silica particles or a part of the surfaces of the silica particles. As a result, in the above-described method, the above-described filler for tires having excellent dispersibility can be easily produced.

In the filler for tires, as described above, the silica particles are attached to and/or covered with the specific aggregation inhibitor, so that the aggregation of the silica particles is inhibited. Thus, the filler for tires has excellent dispersibility, and a tire (described later) having excellent low fuel consumption can be obtained.

That is, the filler for tires is used in the production of a rubber composition for tires and a tire.

To be more specific, the rubber composition for tires of the present invention contains the above-described filler for tires and a rubber component.

As the rubber component, the same rubber component as that of the above-described first invention is used.

These rubber components can be used alone or in combination of two or more.

In view of improvement of the strength and the abrasion resistance of a molded article to be obtained, as the rubber component, preferably, a natural rubber (NR), a styrene butadiene rubber (SBR), and a butadiene rubber (BR) are used, more preferably, a styrene butadiene rubber (SBR) and a butadiene rubber (BR) are used in combination.

When the styrene butadiene rubber (SBR) and the butadiene rubber (BR) are used in combination, the combination ratio thereof is, for example, the same as that of the above-described first invention.

In the rubber composition for tires, the mixing ratio of the filler for tires to the rubber component is the same as that of the above-described first invention.

Also, the rubber composition for tires can contain another filler (filler excluding the above-described filler for tires).

As the other filler, the same one as that of the above-described first invention is used. The mixing ratio thereof is the same as that of the above-described first invention.

The rubber composition for tires preferably contains a vulcanizing agent.

As the vulcanizing agent, the same one as that of the above-described first invention is used. The mixing ratio thereof is the same as that of the above-described first invention.

The rubber composition for tires preferably contains a vulcanizing accelerator.

As the vulcanizing accelerator, the same one as that of the above-described first invention is used. The mixing ratio thereof is the same as that of the above-described first invention.

Furthermore, various known additives can be blended in the rubber composition for tires at an appropriate ratio as needed. Examples thereof include deterioration inhibitor (for example, antiozonant, thermal deterioration inhibitor, oxidation deterioration inhibitor), crack inhibitor, silane coupling agent, vulcanizing accelerator, furthermore, vulcanizing auxiliary, vulcanizing retardant, vulcanizing activator, plasticizer, softener (treated distilled aromatic extracts (TDAE) or the like), and antioxidant.

These additives may be, for example, blended into at least any one of the above-described components in advance, or may be simultaneously blended at the mixing thereof.

The rubber composition for tires can be obtained by mixing the above-described each of the components.

The mixing method is not particularly limited, and for example, a known rubber kneading machine such as roller, Banbury mixer, and kneader can be used. The mixing conditions are not particularly limited, and are appropriately set in accordance with a device to be used or the like.

The rubber composition for tires contains the above-described filler for tires, so that a tire having excellent low fuel consumption can be obtained.

The above-described rubber composition for tires is preferably used in the production of a tire of vehicles with low fuel consumption.

The method for producing a tire by using the above-described rubber composition for tires is not particularly limited, and a known vulcanizing molding method can be used in the same manner as that of the above-described first invention.

The tire thus obtained contains the above-described filler for tires, so that it has excellent low fuel consumption.

Thus, the tire thus obtained can be preferably used as, for example, a tire for various vehicles such as automobiles, two-wheeled vehicles, and railway vehicles (for example, monorails or the like) and for example, a tire for aircrafts.

EXAMPLES

Next, the present invention is described based on Examples and Comparative Examples.

The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<First Invention>

Example 1

A reaction vessel of 1 m$^3$ having a temperature controller was charged with 230 L of sodium silicate aqueous solution (SiO$_2$ concentration: 10 g/L, mole ratio: SiO$_2$/Na$_2$O=3.43), and the temperature thereof was increased to 90° C.

Next, 73 L of 22% sulfuric acid and 440 L of sodium silicate aqueous solution (SiO$_2$ concentration: 90 g/L, mole ratio: SiO$_2$/Na$_2$O=3.43) were simultaneously poured over 120 minutes. After aging for 10 minutes, 16 L of 22% sulfuric acid was poured over 15 minutes. During the above-described reaction, the temperature of a reaction liquid was retained at 90° C., and the reaction liquid was continuously stirred. In this manner, a silica slurry having a pH of 3.3 was obtained.

Next, a sodium hexametaphosphate as an aggregation inhibitor was added to the silica slurry without drying the silica slurry. The addition amount of the aggregation inhibitor with respect to 100 parts by mass of the silica particles in the silica slurry was 5 parts by mass as a solid content.

Next, the silica slurry was stirred and mixed at 550 rpm for 2 minutes with a rotary stirrer (manufactured by Hitachi, Ltd.), and then, by using a spray dryer, the obtained mixture was dried at an entry temperature of 250° C. and an exit temperature of 110° C.

In this manner, a filler for tires containing the silica particles and the aggregation inhibitor was obtained.

By using the obtained filler for tires, each of the components was blended and kneaded by the formulation shown in Table 1, thereby obtaining a rubber composition for tires.

Then, the obtained rubber composition for tires was poured into a sheet mold having a thickness of 2 mm to be vulcanized at 170° C. for 12 minutes, thereby obtaining a molded article.

Examples 2 to 21 and Comparative Examples 1 to 2

A filler for tires was obtained in the same manner as that of Example 1, except that the aggregation inhibitor was changed to those shown in Table 2. In Comparative Example 1, a filler for tires was obtained without using the aggregation inhibitor.

A rubber composition for tires and a molded article were obtained in the same manner as that of Example 1 by using the obtained filler for tires.

A commercially available product was used as the aggregation inhibitor in Examples and Comparative Examples excluding Example 9. In Example 9, as the aggregation inhibitor, a N-octylethanolamine was produced by the following method.

That is, 6.11 g (0.10 mol) of monoethanolamine and 7.72 g (0.04 mol) of 1-bromooctane were mixed in a four-neck flask of 200 mL to be dissolved in 32.27 g of N,N-dimethylformamide (solvent, DMF), so that the obtained mixture was heated and stirred at 90° C. for 8 hours. Thereafter, the DMF (solvent) and an unreacted monoethanolamine were removed from the obtained mixture with a rotary evaporator. In this manner, a N-octylethanolamine was obtained.

Evaluation

<Low Fuel Consumption>

With a viscoelasticity measurement device (device name: EPLEXOR 500N, manufactured by NETZSCH GABO), tan δ was measured under the following conditions.

Measurement Conditions
Measurement mode: strain dispersion
Static load: 10% strain
Dynamic load: ±0.1% to ±10% or more
Frequency: 10 Hz
Temperature: 60° C.

The value of a case where the aggregation inhibitor was not added (Comparative Example 1) was defined as 100, and the tan δ was displayed in an index. The results are additionally shown in Table 2.

It was judged that the smaller the value of the index display of the tan δ was, the more excellent the low fuel consumption was.

<Evaluation of Destruction Properties>

With respect to 0.6 g of filler for tires, 19.4 g of water was added, and 3% suspension liquid was prepared to be left to stand for 1 hour.

Thereafter, by using an ultrasonic homogenizer (manufactured by Branson Ultrasonics Corporation, SONIFIER 250A), the prepared liquid was subjected to ultrasonic treatment at an output of 150 W for 10 minutes.

Then, by using a laser diffraction particle size distribution analyzer (manufactured by Shimadzu Corporation, SALD-7100), the particle distribution of the suspension liquid was measured under the following measurement conditions, and the wk rate (=peak top frequency of particle size of 1 μm or more/peak top frequency of particle size of 1 μm or less) was obtained.

In this manner, the destruction properties of the filler for tires were evaluated. The results are shown in Table 3. The smaller the value of the wk rate was, the more easily the filler for tires destructed.

Measurement Conditions
Refractive index: 1.60 to 0.10
Pump speed: 8
Treatment time of ultrasonic built-in device: 2 minutes

TABLE 1

| | Mixing Formulation (parts by mass) | |
|---|---|---|
| No. | Ex. 1 to 21 • Comp. Ex. 2 | Comp. Ex. 1 |
| Filler for Tires | 63 | 60 |
| SBR | 80 | 80 |
| BR | 20 | 20 |
| OZONONE 6C | 2 | 2 |
| NONFLEX RD | 1.5 | 1.5 |
| SUNTIGHT | 2 | 2 |
| Zinc Oxide | 2 | 2 |
| Stearic Acid "Tsubaki" | 2 | 2 |
| Si75 | 6 | 6 |
| TDAE | 10 | 10 |
| Sulfur | 2.2 | 2.2 |
| SANCELER D | 1.8 | 1.8 |
| SANCELER CM-G | 0.5 | 0.5 |

The details of abbreviations in Table are shown in the following.

SBR: styrene butadiene rubber, SL-563, manufactured by JSR Corporation

BR: polybutadiene rubber, JSR BR-51, manufactured by JSR Corporation

OZONONE 6C: antiozonant, manufactured by Seiko Chemical Co., Ltd.

NONFLEX RD: thermal oxidation deterioration inhibitor, manufactured by Seiko Chemical Co., Ltd.

SUNTIGHT: surface crack inhibitor, manufactured by Seiko Chemical Co., Ltd.

Zinc oxide: zinc oxide (vulcanizing accelerator), manufactured by HakusuiTech Co., Ltd.

Stearic acid "Tsubaki": vulcanizing accelerator, manufactured by NOF CORPORATION Si75: silane coupling agent, manufactured by Evonik TDAE: treated distilled aromatic extracts, softener, manufactured by Nippon Oil Corporation Sulfur: dispersible powdered sulfur, manufactured by Yabu Shoten SANCELER D: vulcanizing accelerator, manufactured by SANSHIN CHEMICAL INDUSTRY CO., LTD.

SANCELER CM-G: vulcanizing accelerator, manufactured by SANSHIN CHEMICAL INDUSTRY CO., LTD.

TABLE 2

| No. | | Kind | Low Fuel Consumption |
|---|---|---|---|
| Comp. Ex. 1 | — | — | 100 |
| Comp. Ex. 2 | Polyethylene Glycol | PEG 600 | 105 |
| Ex. 1 | Phosphate and Derivative Thereof | Sodium Hexametaphosphate | 87 |
| Ex. 2 | | Sodium Pyrophosphate | 86 |
| Ex. 3 | Amino Alcohol | Amino Alcohol EA | 75 |
| Ex. 4 | | Amino Alcohol MBD | 82 |
| Ex. 5 | | Amino Alcohol DEA | 78 |
| Ex. 6 | | Amino Alcohol TEA | 82 |
| Ex. 7 | | Amino Alcohol AEE | 82 |
| Ex. 8 | | Amino Alcohol MBM | 73 |
| Ex. 9 | | Amino Alcohol MOM | 72 |
| Ex. 10 | Cationic Surfactant | ADEKA MINE 4DAC-85 | 84 |
| Ex. 11 | Water-Soluble Aminosilane | A1120 | 88 |
| Ex. 12 | Nitrogen Containing Heterocyclic Compound | AMPHITOL 20YB | 85 |
| Ex. 13 | | CUREZOL 2E4MZ | 89 |
| Ex. 14 | | HARTALL M33 | 86 |
| Ex. 15 | Alkyl Alkanolamine (Nonionic Surfactant) | AMIET 320 | 94 |
| Ex. 16 | Tertiary Amine Compound | NDSA (Dimethylstearylamine) | 91 |
| Ex. 17 | Alkyl Alkanolamide (Nonionic Surfactant) | AMINON C11S | 94 |
| Ex. 18 | | AMINON L-02 | 98 |
| Ex. 19 | Polyvinyl Alcohol | POVAL PVA 205 | 83 |
| Ex. 20 | Non-Zinc Soap + Saturated Fatty Acid Ester (Mixture) | Struktol HT207 | 94 |
| Ex. 21 | Glycerine Fatty Acid Ester | EXCEL VS-95 | 99 |

The details of abbreviations in Table are shown in the following.

PEG 600: polyethylene glycol, number average molecular weight of 600, manufactured by Wako Pure Chemical Industries, Ltd.

Amino alcohol EA: N-(β-aminoethyl)ethanolamine (secondary amino alcohol), manufactured by Nippon Nyukazai Co., Ltd.

Amino alcohol MBD: N-n-butyl-N,N-diethanolamine (tertiary amino alcohol), manufactured by Nippon Nyukazai Co., Ltd.

Amino alcohol DEA: diethanolamine (secondary amino alcohol), manufactured by Nippon Nyukazai Co., Ltd.

Amino alcohol TEA: triethanolamine (tertiary amino alcohol), manufactured by Nippon Nyukazai Co., Ltd.

Amino alcohol AEE: 2-(2-aminoethoxy)ethanol (primary amino alcohol), manufactured by Nippon Nyukazai Co., Ltd.

Amino alcohol MBM: N-n-butylethanolamine (secondary amino alcohol), manufactured by Nippon Nyukazai Co., Ltd.

Amino alcohol MOM: N-octylethanolamine (secondary amino alcohol), manufactured by Nippon Nyukazai Co., Ltd.

ADEKA MINE 4DAC-85: di-long-chain alkyl-type ammonium chloride, manufactured by ADEKA CORPORATION A1120: N-(2-aminoethyl)-3-aminopropyltrimethoxysilane, manufactured by Momentive Performance Materials AMPHITOL 20YB: 2-alkyl-N-carboxymethyl-N-hydroxyethyl imidazolinium betaine, manufactured by Kao Corporation CUREZOL 2E4MZ: 2-ethyl-4-methyl imidazole, manufactured by SHIKOKU CHEMICALS CORPORATION HARTALL M33: tall oil fatty acid imidazoline, manufactured by Harima Chemicals Group, Inc.

AMIET 320: polyoxyethylenestearylamine, manufactured by Kao Corporation AMINON C11S: coconut oil fatty acid N-methylethanolamide, manufactured by Kao Corporation AMINON L-02: diethanolamide laurate, manufactured by Kao Corporation POVAL PVA 205: KURARAY POVAL PVA 205, polyvinyl alcohol, saponification degree of 86.5 to 89.0%, manufactured by KURARAY CO., LTD.

Struktol HT207: mixture of non-zinc soap and saturated fatty acid ester, manufactured by S&S Japan Co., LTD.

EXCEL VS-95: lipophilic glycerine monostearate, manufactured by Kao Corporation

TABLE 3

| No. | Aggregation Inhibitor | wk Rate |
|---|---|---|
| Comp. Ex. 1 | — | 7.09 |
| Ex. 1 | Sodium Hexametaphosphate | 2.36 |

According to Table 3, it is found out that the destruction properties (destruction properties of an aggregate (secondary particles) of the filler for tires) of the filler for tires of Example 1 are higher than those of the filler for tires of Comparative Example 1.

It is considered that in the filler for tires of Example 1, the aggregation inhibitor exists near the silica particles (primary particles), so that the aggregation inhibiting effect of the aggregation inhibitor is developed near the silica particles (primary particles) and as result, the aggregate (secondary particles) of the filler for tires easily destructs. From this result, in the filler for tires of Example 1, it is considered that the silica particles (primary particles) are covered with the aggregation inhibitor.

<Secondary Invention>

Production Example 1 (Production of Phosphate Ester Modified Product of Polyvinyl Alcohol)

A four-neck flask of 100 mL was charged with 5.69 g of KURARAY POVAL PVA 205 (polyvinyl alcohol, saponification degree of 86.5 to 89.0%, manufactured by KURARAY CO., LTD) and 51.21 g of dimethylsulfoxide (DMSO), and the charged mixture was stirred, while heated at 100° C., so that a solution of KURARAY POVAL PVA 205 was obtained. In the solution, the concentration of the polyvinyl alcohol was 10 mass %.

Next, 1.92 g of 85 mass % solution of phosphoric acid ($H_3PO_4$) was added to the obtained solution by 6 times every 30 minutes. The total amount of the 85 mass % solution of the phosphoric acid ($H_3PO_4$) was 11.52 g, and the total amount of the solid content of the phosphoric acid ($H_3PO_4$) was 9.8 g.

Next, the solution was stirred for 2 hours, so that the polyvinyl alcohol reacted with the phosphoric acid to be then allowed to cool until the room temperature.

Next, 100 g of acetone was added to a reaction liquid, so that a reaction product was precipitated. The obtained precipitation was filtered with a 200 mesh filter to be subjected to ultrasonic cleansing with acetone (10 minutes×3 times). Next, the residue was dissolved in water, so that a 20% aqueous solution was prepared. Then, 100 g of acetone was added to the obtained aqueous solution, so that an object was precipitated. Next, the obtained precipitation was filtered with a 200 mesh filter, and the obtained residue was subjected to hot air drying at 60° C. for 2 hours.

In this manner, a phosphate ester modified product (PVP) of the polyvinyl alcohol was obtained.

Production Example 2 (Production of Metal Salt of Phosphate Ester Modified Product of Polyvinyl Alcohol)

The phosphate ester modified product (PVP) of the polyvinyl alcohol obtained in Production Example 1 was dissolved in the water, so that a 25 mass % PVP aqueous solution was obtained.

Then, a 50 mass % of sodium hydroxide aqueous solution was added to the obtained PVP aqueous solution. The addition amount of the sodium hydroxide was 1 equivalent per 1 equivalent of phosphate ester group in the PVP.

Thereafter, the obtained mixture was stirred (500 rpm) at the room temperature for 30 minutes, so that a metal salt (sodium salt) of the PVP was obtained.

Production Example 3 (Production of Amine Salt of Phosphate Ester Modified Product of Polyvinyl Alcohol)

The phosphate ester modified product (PVP) of the polyvinyl alcohol obtained in Production Example 1 was dissolved in the water, so that a 25 mass % PVP aqueous solution was obtained.

Then, a 50 mass % of N-n-butylethanolamine aqueous solution was added to the obtained PVP aqueous solution. The addition amount of the N-n-butylethanolamine was 1 equivalent per 1 equivalent of phosphate ester group in the PVP.

Thereafter, the obtained mixture was stirred (500 rpm) at the room temperature for 30 minutes, so that an amine salt (alkanolamine salt) of the PVP was obtained.

Example 22

A reaction vessel of 1 m³ having a temperature controller was charged with 230 L of sodium silicate aqueous solution ($SiO_2$ concentration: 10 g/L, mole ratio: $SiO_2/Na_2O$=3.43), and the temperature thereof was increased to 90° C.

Next, 73 L of 22% sulfuric acid and 440 L of sodium silicate aqueous solution ($SiO_2$ concentration: 90 g/L, mole ratio: $SiO_2/Na_2O$=3.43) were simultaneously poured over 120 minutes. After aging for 10 minutes, 16 L of 22% sulfuric acid was poured over 15 minutes. During the above-described reaction, the temperature of a reaction liquid was retained at 90° C., and the reaction liquid was continuously stirred. In this manner, a silica slurry having a pH of 3.3 was obtained.

Next, a KURARAY POVAL PVA 205 (polyvinyl alcohol, saponification degree of 86.5 to 89.0%, manufactured by KURARAY CO., LTD.) as an aggregation inhibitor was added to the silica slurry without drying the silica slurry. The addition amount of the aggregation inhibitor with respect to 100 parts by mass of the silica particles in the silica slurry was 5 parts by mass as a solid content.

Next, the silica slurry was stirred and mixed at 550 rpm for 2 minutes with a rotary stirrer (manufactured by Hitachi, Ltd.), and then, by using a spray dryer, the obtained mixture was dried at an entry temperature of 250° C. and an exit temperature of 110° C.

In this manner, a filler for tires containing the silica particles and the aggregation inhibitor was obtained.

By using the obtained filler for tires, each of the components was blended and kneaded by the formulation shown in Table 4, thereby obtaining a rubber composition for tires.

Then, the obtained rubber composition for tires was poured into a sheet mold having a thickness of 2 mm to be vulcanized at 170° C. for 12 minutes, thereby obtaining a molded article.

Examples 23 to 29 and Comparative Examples 3 to 4

A filler for tires was obtained in the same manner as that of Example 22, except that the aggregation inhibitor was changed to those shown in Table 5. A rubber composition for tires and a molded article were obtained in the same manner as that of Example 22 by using the obtained filler for tires.

In Comparative Example 3, a filler for tires was obtained without using the aggregation inhibitor. In Comparative Example 4, a filler for tires was obtained without using the aggregation inhibitor, and at the time of the production of a rubber composition for tires, a KURARAY POVAL PVA 205 (polyvinyl alcohol, saponification degree of 86.5 to 89.0%, manufactured by KURARAY CO., LTD.), along with the filler for tires, was added.

Evaluation

<Low Fuel Consumption>

With a viscoelasticity measurement device (device name: EPLEXOR 500N, manufactured by NETZSCH GABO), tan δ was measured under the following conditions.

Measurement Conditions

Measurement mode: strain dispersion

Static load: 10% strain

Dynamic load: ±0.1% to ±10% or more

Frequency: 10 Hz

Temperature: 60° C.

The value of a case where the aggregation inhibitor was not added (Comparative Example 1) was defined as 100, and the tan δ was displayed in an index. The results are additionally shown in Table 5.

It was judged that the smaller the value of the index display of the tan δ was, the more excellent the low fuel consumption was.

TABLE 4

| | Mixing Formulation (parts by mass) | | |
|---|---|---|---|
| No. | Ex. 22 to 29 | Comp. Ex. 3 | Comp. Ex. 4 |
| Filler for Tires | 63 | 60 | 60 |
| Polyvinyl Alcohol | 0 | 0 | 3 |
| SBR | 80 | 80 | 80 |
| BR | 20 | 20 | 20 |
| OZONONE 6C | 2 | 2 | 2 |
| NONFLEX RD | 1.5 | 1.5 | 1.5 |
| SUNTIGHT | 2 | 2 | 2 |
| Zinc Oxide | 2 | 2 | 2 |
| Stearic Acid "Tsubaki" | 2 | 2 | 2 |
| Si75 | 6 | 6 | 6 |
| TDAE | 10 | 10 | 10 |
| Sulfur | 2.2 | 2.2 | 2.2 |
| SANCELER D | 1.8 | 1.8 | 1.8 |
| SANCELER CM-G | 0.5 | 0.5 | 0.5 |

The details of abbreviations in Table are shown in the following.

SBR: styrene butadiene rubber, SL-563, manufactured by JSR Corporation

BR: polybutadiene rubber, JSR BR-51, manufactured by JSR Corporation

OZONONE 6C: antiozonant, manufactured by Seiko Chemical Co., Ltd.

NONFLEX RD: thermal oxidation deterioration inhibitor, manufactured by Seiko Chemical Co., Ltd.

SUNTIGHT: surface crack inhibitor, manufactured by Seiko Chemical Co., Ltd.

Zinc oxide: zinc oxide (vulcanizing accelerator), manufactured by HakusuiTech Co., Ltd.

Stearic acid "Tsubaki": vulcanizing accelerator, manufactured by NOF CORPORATION Si75: silane coupling agent, manufactured by Evonik TDAE: treated distilled aromatic extracts, softener, manufactured by Nippon Oil Corporation Sulfur: dispersible powdered sulfur, manufactured by Yabu Shoten SANCELER D: vulcanizing accelerator, manufactured by SANSHIN CHEMICAL INDUSTRY CO., LTD.

SANCELER CM-G: vulcanizing accelerator, manufactured by SANSHIN CHEMICAL INDUSTRY CO., LTD.

TABLE 5

| No. | Kind | | Low Fuel Consumption |
|---|---|---|---|
| Comp. Ex. 3 | — | — | 100 |
| Comp. Ex. 4 | Polyvinyl Alcohol | POVAL PVA 205 | 106 |
| Ex. 22 | | POVAL PVA 205 | 83 |
| Ex. 23 | | POVAL PVA 105 | 82 |
| Ex. 24 | | POVAL PVA 505 | 88 |
| Ex. 25 | | POVAL PVA 203 | 84 |
| Ex. 26 | | POVAL PVA 210 | 84 |
| Ex. 27 | Phosphate Ester Modified Product of Polyvinyl Alcohol | PVP | 81 |
| Ex. 28 | Salt of Phosphate Ester Modified Product of Polyvinyl Alcohol | Metal Salt of PVP | 80 |
| Ex. 29 | | Amine Salt of PVP | 80 |

The details of abbreviations in Table are shown in the following.

POVAL PVA 205: KURARAY POVAL PVA 205, polyvinyl alcohol, saponification degree of 86.5 to 89.0%, manufactured by KURARAY CO., LTD.

POVAL PVA 105: KURARAY POVAL PVA 105, polyvinyl alcohol, saponification degree of 98.0 to 99.0%, manufactured by KURARAY CO., LTD.

POVAL PVA 505: KURARAY POVAL PVA 505, polyvinyl alcohol, saponification degree of 72.5 to 74.5%, manufactured by KURARAY CO., LTD.

POVAL PVA 203: KURARAY POVAL PVA 203, polyvinyl alcohol, saponification degree of 87.0 to 89.0%, manufactured by KURARAY CO., LTD.

POVAL PVA 210: KURARAY POVAL PVA 210, polyvinyl alcohol, saponification degree of 87.0 to 89.0%, manufactured by KURARAY CO., LTD.

PVP: phosphate ester modified product of polyvinyl alcohol obtained in Production Example 1

Metal salt of PVP: metal salt (sodium salt) of phosphate ester modified product of polyvinyl alcohol obtained in Production Example 2

Amine salt of PVP: amine salt (alkanolamine salt) of phosphate ester modified product of polyvinyl alcohol obtained in Production Example 3

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The filler for tires, the rubber composition for tires, the tire, the method for producing a filler for tires, and the aggregation inhibitor of the present invention are used in, for example, a tire for various vehicles such as automobiles, two-wheeled vehicles, and railway vehicles (for example, monorails or the like) and for example, a tire for aircrafts.

The invention claimed is:

1. A filler for tires comprising:
   silica particles and an aggregation inhibitor inhibiting the aggregation of the silica particles, wherein
   the aggregation inhibitor contains at least one selected from the group consisting of phosphate and derivative thereof, amino alcohol, water-soluble aminosilane, nitrogen-containing heterocyclic compound, tertiary amine compound, and polyvinyl alcohol,
   the aggregation inhibitor is absorbed to surfaces of primary particles of the silica,
   a ratio of the aggregation inhibitor is 0.1 parts by mass or more and 10 parts by mass or less relative to 100 parts by mass of the silica particles, and
   the filler for tires is a dried product of the silica particles to which the aggregation inhibitor is absorbed.

2. A filler for tires comprising:
   silica particles and an aggregation inhibitor inhibiting the aggregation of the silica particles, wherein
   the aggregation inhibitor contains a polyvinyl alcohol and/or a modified product thereof,
   the aggregation inhibitor is absorbed to surfaces of primary particles of the silica, and
   a ratio of the aggregation inhibitor is 0.1 parts by mass or more and 10 parts by mass or less relative to 100 parts by mass of the silica particles.

3. The filler for tires according to claim 2, wherein the polyvinyl alcohol has a saponification degree of 80% or more.

4. The filler for tires according to claim 2, wherein the aggregation inhibitor contains a phosphate ester modified product of a polyvinyl alcohol.

5. The filler for tires according to claim 2, wherein the aggregation inhibitor contains a salt of a phosphate ester modified product of a polyvinyl alcohol.

6. A rubber composition for tires comprising:
   the filler for tires according to claim 1 and
   a rubber component.

7. A rubber composition for tires comprising:
   the filler for tires according to claim 2 and
   a rubber component.

8. A tire made of the rubber composition for tires according to claim 6.

9. A tire made of the rubber composition for tires according to claim 7.

10. A method for producing a filler for tires comprising:
    an adding step of adding an aggregation inhibitor to a silica slurry obtained from a sodium silicate aqueous solution and containing a never-dried silica and
    a drying step of drying the silica slurry after the adding step, wherein
    the aggregation inhibitor contains at least one selected from the group consisting of phosphate and derivative thereof, amino alcohol, water-soluble aminosilane, nitrogen-containing heterocyclic compound, tertiary amine compound, and polyvinyl alcohol,
    the aggregation inhibitor is absorbed to surfaces of primary particles of the silica, and
    a ratio of the aggregation inhibitor is 0.1 parts by mass or more and 10 parts by mass or less relative to 100 parts by mass of the silica particles.

11. A method for producing a filler for tires comprising:
    an adding step of adding an aggregation inhibitor to a silica slurry obtained by a sodium silicate aqueous solution and containing a never-dried silica and
    a drying step of drying the silica slurry after the adding step, wherein
    the aggregation inhibitor contains a polyvinyl alcohol and/or a modified product thereof,
    the aggregation inhibitor is absorbed to surfaces of primary particles of the silica, and
    a ratio of the aggregation inhibitor is 0.1 parts by mass or more and 10 parts by mass or less relative to 100 parts by mass of the silica particles.

* * * * *